(12) United States Patent
Wagner et al.

(10) Patent No.: US 6,389,943 B1
(45) Date of Patent: May 21, 2002

(54) ADJUSTABLE PRODUCT GUIDE ASSEMBLY FOR PRODUCT SAW DEVICE

(75) Inventors: Richard C. Wagner, Frankfort; Ronald R. Davis, Lockport, both of IL (US)

(73) Assignee: Hollymatic Corporation, Countryside, IL (US)

( * ) Notice: Subject to any disclaimer, the term of this patent is extended or adjusted under 35 U.S.C. 154(b) by 0 days.

(21) Appl. No.: 09/559,647

(22) Filed: Apr. 28, 2000

(51) Int. Cl.$^7$ .............................. B26D 7/01; B23D 55/00; B23Q 15/22
(52) U.S. Cl. ...................... 83/468.2; 83/468.7; 83/932
(58) Field of Search .................... 83/468.2, 468.7, 83/932, 703, 707, 727, 717, 729, 438

(56) References Cited

U.S. PATENT DOCUMENTS

| 43,634 A | * | 7/1864 | Brombaucher | 83/468.7 |
|---|---|---|---|---|
| 1,402,140 A | * | 1/1922 | Braun | 83/717 |
| 1,641,636 A | * | 9/1927 | Lasswell | 83/468.7 |
| 1,707,654 A | * | 4/1929 | Campbell | 83/468.2 X |
| 1,742,575 A | * | 1/1930 | CAMpbell | 83/729 |
| 2,380,700 A | * | 7/1945 | Lasar | 83/438 |
| 2,388,588 A | * | 11/1945 | Wood | 83/707 |
| 2,404,557 A | * | 7/1946 | Wood | 83/729 |
| 2,430,504 A | | 11/1947 | Grills | 83/111 |
| 2,433,600 A | | 12/1947 | Cohen | 83/717 |
| 2,621,693 A | | 12/1952 | Grills | 83/102.1 |
| 2,722,254 A | | 11/1955 | Fink et al. | 83/448 |
| 2,850,055 A | * | 9/1958 | Lasar | 83/707 X |
| 2,852,049 A | * | 9/1958 | Peterson | 83/468.7 X |
| 2,953,853 A | * | 9/1960 | Tieman | 83/729 X |
| 3,066,709 A | * | 12/1962 | Bale, Jr. et al. | 83/717 |
| 3,975,977 A | * | 8/1976 | Mornberg | 83/707 |
| 4,262,565 A | | 4/1981 | Pedi | 83/76.6 |
| 4,372,185 A | | 2/1983 | Pila | 83/101 |
| 4,612,836 A | | 9/1986 | Henn et al. | 83/729 |
| 4,711,537 A | | 12/1987 | Schindl et al. | 359/393 |
| 4,771,669 A | * | 9/1988 | Bianchi | 83/468.7 |
| 5,224,407 A | | 7/1993 | Koch et al. | 83/468.7 |

* cited by examiner

*Primary Examiner*—M. Rachuba
*Assistant Examiner*—Charles Goodman
(74) *Attorney, Agent, or Firm*—Sughrue Mion, PLLC

(57) ABSTRACT

An adjustable product guide assembly for a product saw device includes a product guide plate mounted to a first bracket which is slidable on a bar; a handle mounted on top of a second bracket in an ergonomic location, the handle being connected to a shaft and which rotates a first worm gear pinned to the shaft; a second worm gear which is turned by the first worm gear, the second worm gear which is pinned to a pinion gear; a gear rack on the bar, the gear rack having gear rack teeth which are engaged with the pinion gear; a biasing member disposed between the second bracket that houses the first worm gear and the second worm gear and the first bracket; wherein when the handle is pressed down, in a gear releasing mechanism, the second bracket pivots and compresses the biasing member such that the gear rack teeth disengage from the pinion gear via the first worm gear and the second worm gear, and the product guide plate can be moved along the gear rack teeth of the bar. The gears are sized so that one revolution of the handle turns the worm gear by 36 degrees, which causes the pinion gear to displace 0.2 inches of linear motion. This 10:1 ratio of the turning handle and the turning pinion gear provides the ability to make small adjustments to the position of the product guide plate.

10 Claims, 6 Drawing Sheets

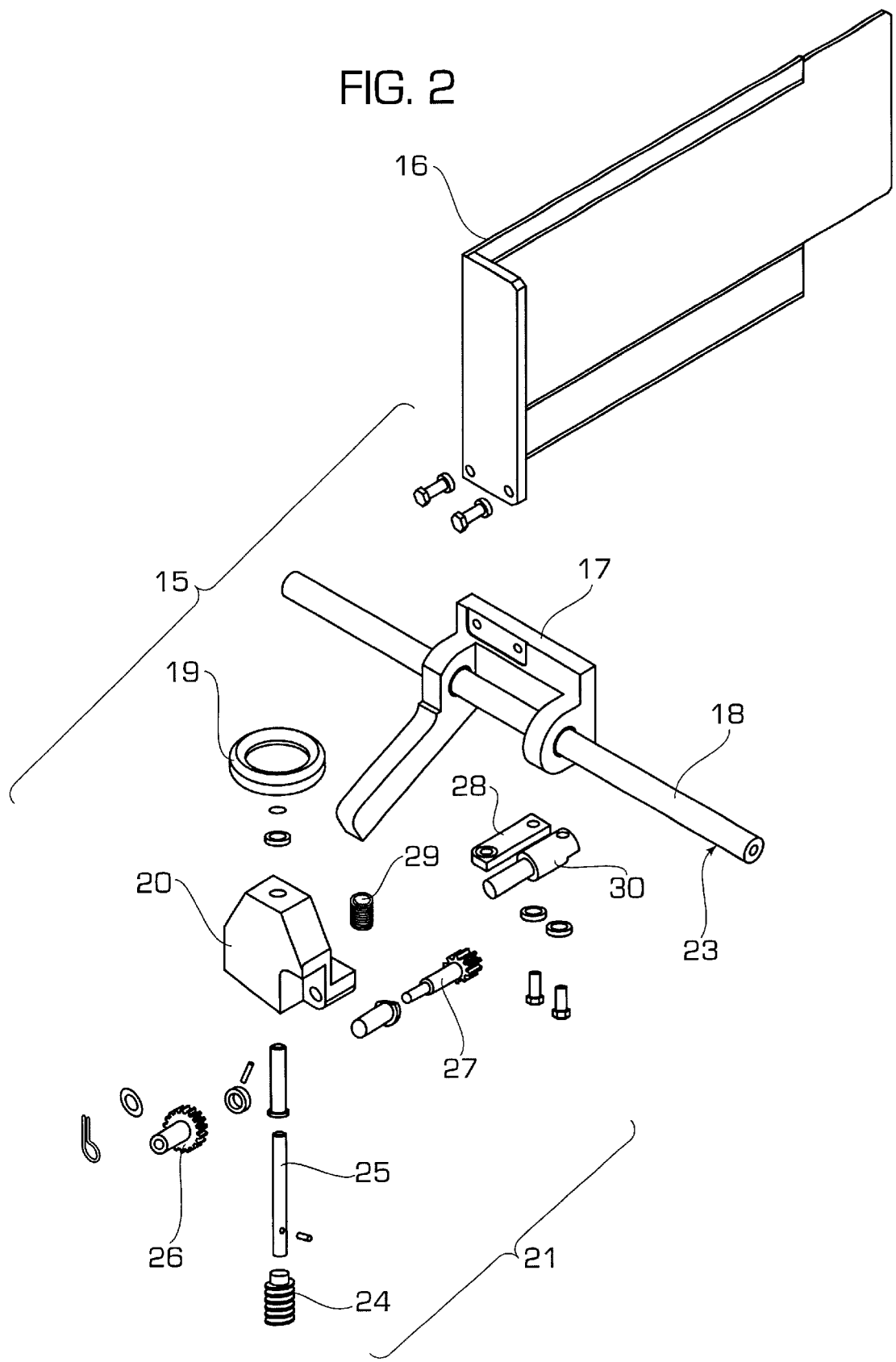

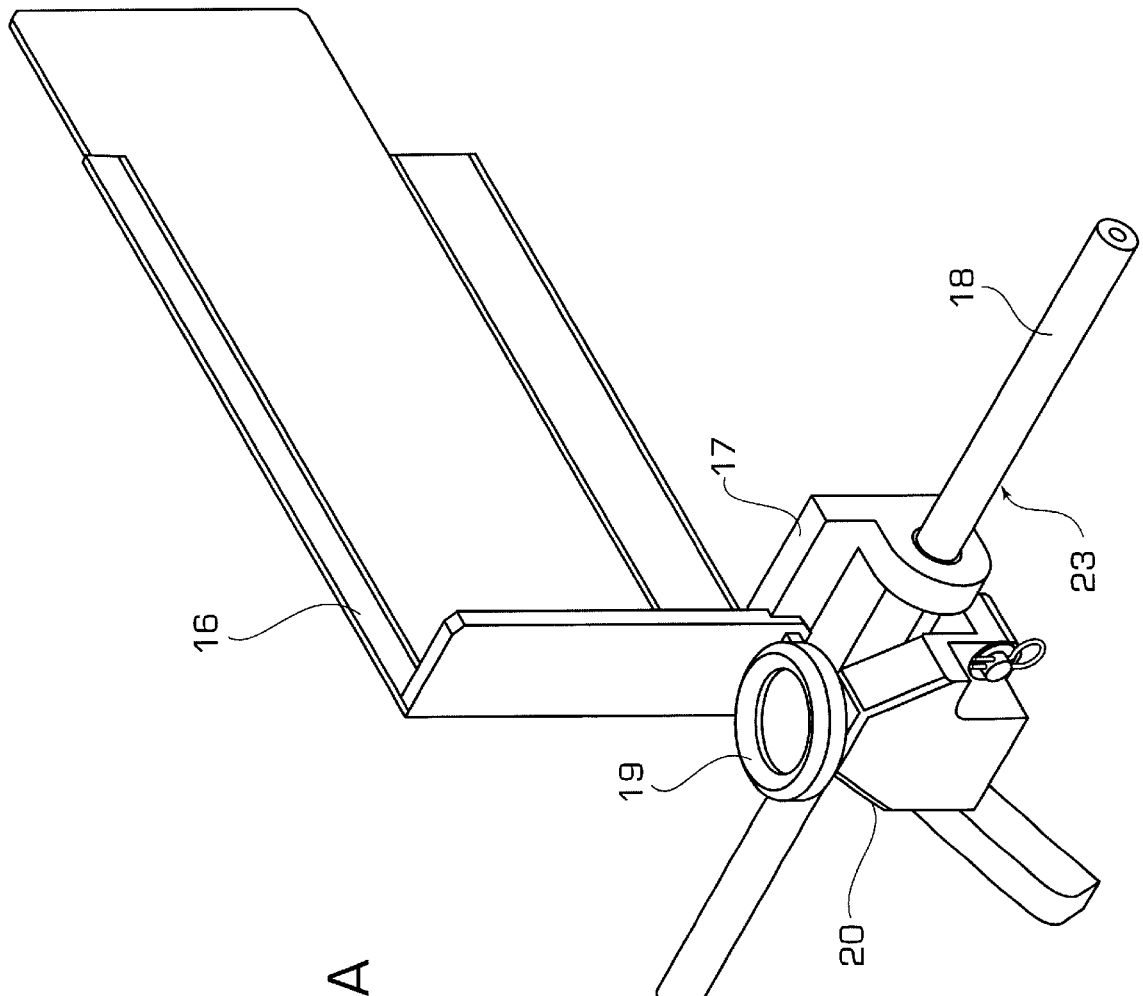

ADJUSTABLE PRODUCT GUIDE ASSEMBLY FOR PRODUCT SAW DEVICE

The present invention relates to an adjustable product guide assembly for adjusting the thickness of a product to be cut in a product saw device.

BACKGROUND OF THE INVENTION

In conventional adjustable product guide assemblies, particularly meat guide assemblies for meat saws, an apparatus for determining the thickness of the product is usually desired. This apparatus usually includes a gauge plate which is adjustably mounted on the product saw device table, and which is adjustable to the product thickness.

For example, Fink et al, U.S. Pat. No. 2,722,254, disclose a gauge adjusting means for conventional meat cutting band saws, which includes a vertical thickness gauge plate (14) adjustably mounted at the side of the table (6) rearwardly from the cutting plane of the blade (11), to facilitate setting the position of the gauge plate (14) relative to the blade (11). A vertical pusher plate (15) is slidable along one side of the table (5) to push and hold smaller pieces of meat against the thickness gauge plate (14) when the table is reciprocated to move the meat past the blade (11). A hand crank (251) is pinned on the front end of the shaft (249) which extends beneath the framework of the movable table (5). When the hand crank (251) is rotated, the screw (246) shifts the nut (245), and the gauge plate slide (240) is engaged between the lug (244) and the arm (247) of the nut (245), with the gauge plate (14) being shifted correspondingly.

However, Fink et al suffer from the disadvantages that the position of the hand crank (251) at the left side of the plate (5) is not convenient for the operator; small adjustments to the product guide assembly are difficult because there is no relationship between the turning of the hand crank (251) and the movement of the screw (246), etc.; and the structure of the assembly (i.e., screw (246), nut (245), lug (244) etc.) makes the gear engagement difficult to release for larger position movements.

Likewise, Cohen, U.S. Pat. No. 2,433,600, discloses a conventional meat slicing machine including a vertical slice regulating plate (15) which is longitudinally adjustable on a base (11) at right angles to the direction of movement of the reciprocal table (13), which is adapted to define an adjustable spaced relation relative to a saw (14) for regulating the thickness of a slice of meat to be cut. A rack bar (21) is reciprocally slidable relative to the under side of slide support (19), and longitudinal motion imparted thereto by handle (18) effects a corresponding longitudinal adjusting motion of rack bar (21). To lock the plate (15) in a desired adjusted position, a handle (32) is rotated clockwise to its extreme position limited by frictional contact between disc (31), bushing (29), gear (28), and washer (33). To release the pinion (28) and plate (15), the handle (32) is rotated counterclockwise to engage stop bar (34).

However, Cohen suffers from the disadvantages that two operations are required to lock the vertical plate (15) in position (i.e., the handle (18) and handle (32) must both be operated in sequence); and as stated above with respect to Fink et al, the position of the handle (32) to the side of the device is not convenient; small adjustments to the product guide assembly are difficult due to the fact that there is no relationship between the turning of the handle (32) and the movement of the pinion (28) and rack bar (21); and the structure of the assembly (i.e., using handle (32) to lock the plate (15) after the plate is moved using handle (18) makes the gear engagement difficult to release for larger position movements.

SUMMARY OF THE INVENTION

It is an object of the present invention to make a product guide assembly which can make small adjustments in a product guide which sets the thickness of a product to be cut.

Further, the object of the present invention is to provide an easy to release gear engagement so that the adjustable product guide assembly can be slid into any position for larger position movements.

Finally, the object of the present invention is to provide the placement of the control knob for the operator of the adjustable product guide assembly of the product saw device, in a more convenient and ergonomic position, so that the adjustable product guide assembly can be easily operated.

The present invention includes an adjustable product guide assembly for a product saw device which includes a product guide plate mounted to a first bracket which is slidable on a bar; a handle mounted on top of a second bracket and connected to a shaft, the handle which rotates a first worm gear pinned to the shaft; a second worm gear which is turned by the first worm gear, the second worm gear which is pinned to a pinion gear; a gear rack on the bar, the gear rack having gear rack teeth which are engaged with the pinion gear; a biasing member which is pressed between the second bracket that houses the first worm gear and the second worm gear, and a third bracket which is attached to the first bracket; wherein in a gear releasing mechanism, when the handle is pressed down, the second bracket pivots and compresses the biasing member such that the gear rack teeth disengage from the pinion gear via the first worm gear and the second worm gear, and the product guide plate can be moved along the gear rack teeth of the bar.

The gears are sized so that one revolution of the handle turns the worm gear 36 degrees, which causes the pinion gear to displace 0.2 inches of linear motion. This 10:1 ratio of the turning handle and the turning pinion gear provides the ability to make small adjustments to the position of the product guide plate.

In summary, the present invention allows small adjustments to be made to the position of the meat guide; an easy gear releasing mechanism so that the product guide plate can be slid into any position for larger position movements; and a placement of the handle on top of the first bracket which is an operator-convenient (ergonomic) location, so that the adjustable product guide assembly is easily operated.

BRIEF DESCRIPTION OF THE DRAWINGS

The above objectives and advantages of the present invention will become more apparent by describing detail the preferred embodiment thereof, with reference to the attached drawings in which:

FIG. 2 shows exploded perspective view of an adjustable product guide assembly according to the present invention.

FIG. 3A shows a perspective view of the adjustable product guide assembly according to the present invention.

DETAILED DESCRIPTION OF THE PREFERRED EMBODIMENTS

The present invention relates to an adjustable product guide assembly for adjusting the thickness of a product to be cut in a product saw device, particularly an adjustable meat guide assembly for a meat saw.

Figure 1:
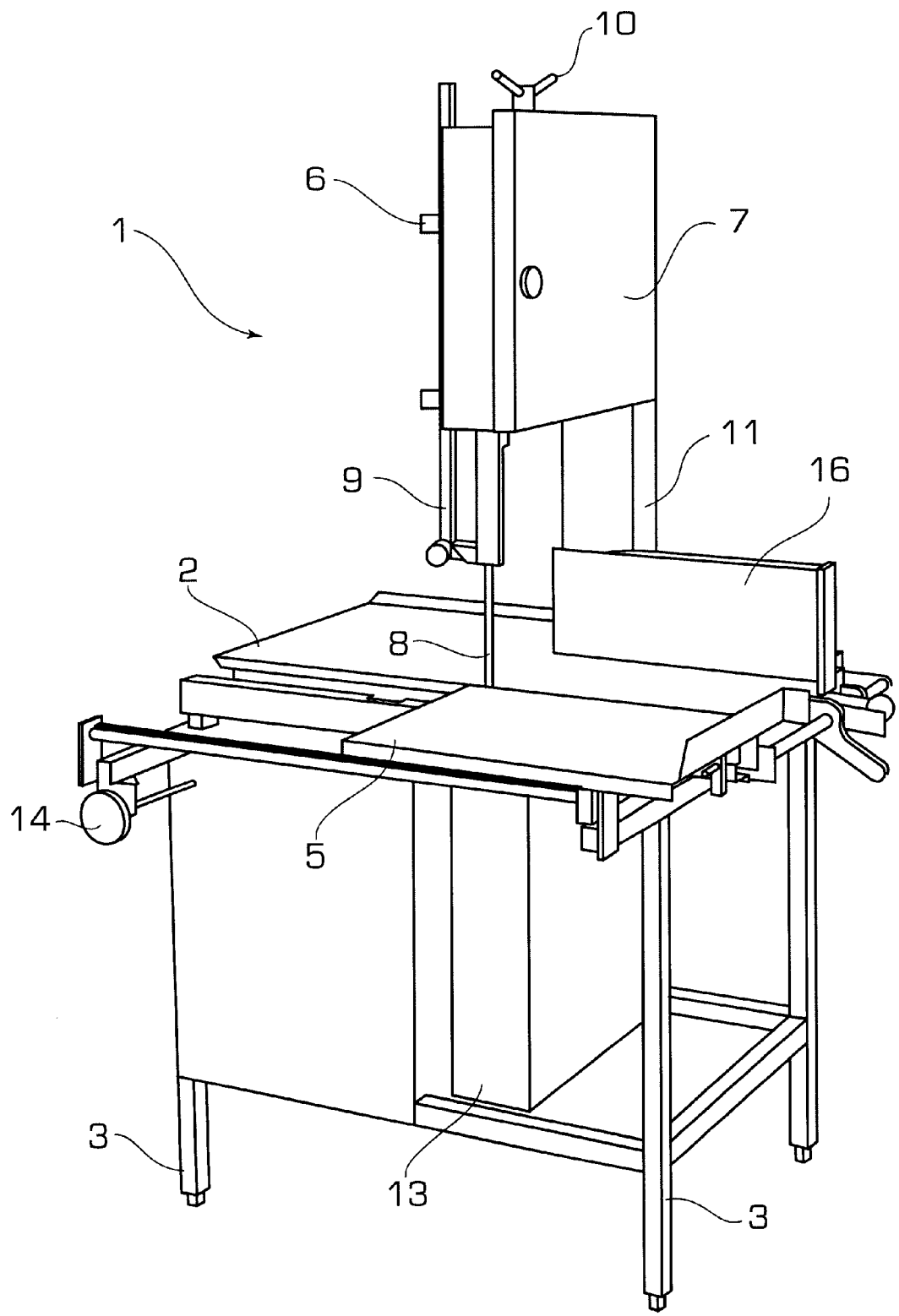
FIG. 1 shows a perspective view of a conventional product saw device including an adjustable product guide assembly of the present invention.

An embodiment of the present invention is shown in FIG. 1. FIG. 1 shows a conventional motor-driven product saw device 1 having a frame made of a strong material which is easy to clean, such as stainless steel. The product saw device 1 includes a two-piece swing open stationary table 2 supported on a number of adjustable legs 3, and includes a movable front table 5 which swings open for easy cleaning. A product guide plate 16 is disposed at one side end of the stationary table 2, and is movable for fine regulation of cut thickness.

A saw compartment 6 is disposed above the stationary table 2, and includes blades for the saw device within, which can be reached through a safety interlocked hinged and removable door 7. The saw blade 8 of the product saw device projects from the saw compartment 6 towards the stationary table 2. A fully adjustable side-mounted blade guard 9 allows visibility while cutting with the product saw device, but protects the operator from the saw blade 8. A handle 10 having a visual indicator for adjustment of the blade tension, is disposed above the compartment 6.

The saw compartment 6, which is also made of stainless steel, is supported on a tubular column 11 which provides one-piece rigid support. A removable lower wheel (not shown) is disposed in a stainless steel lower housing cover 13 which is a safety interlocked lower wheel enclosure 13 which doubles as a removable scrap container 13 with a slide-out bottom for easy cleaning.

The stop/start button 14 is disposed at one side end of the table 2, and the button 14 is pulled to start and pushed to stop. A 3 HP motor coupled with a double V-belt drive (not shown) is designed to deliver high torque, and are both protected in the stainless steel housing.

Figure 3B:
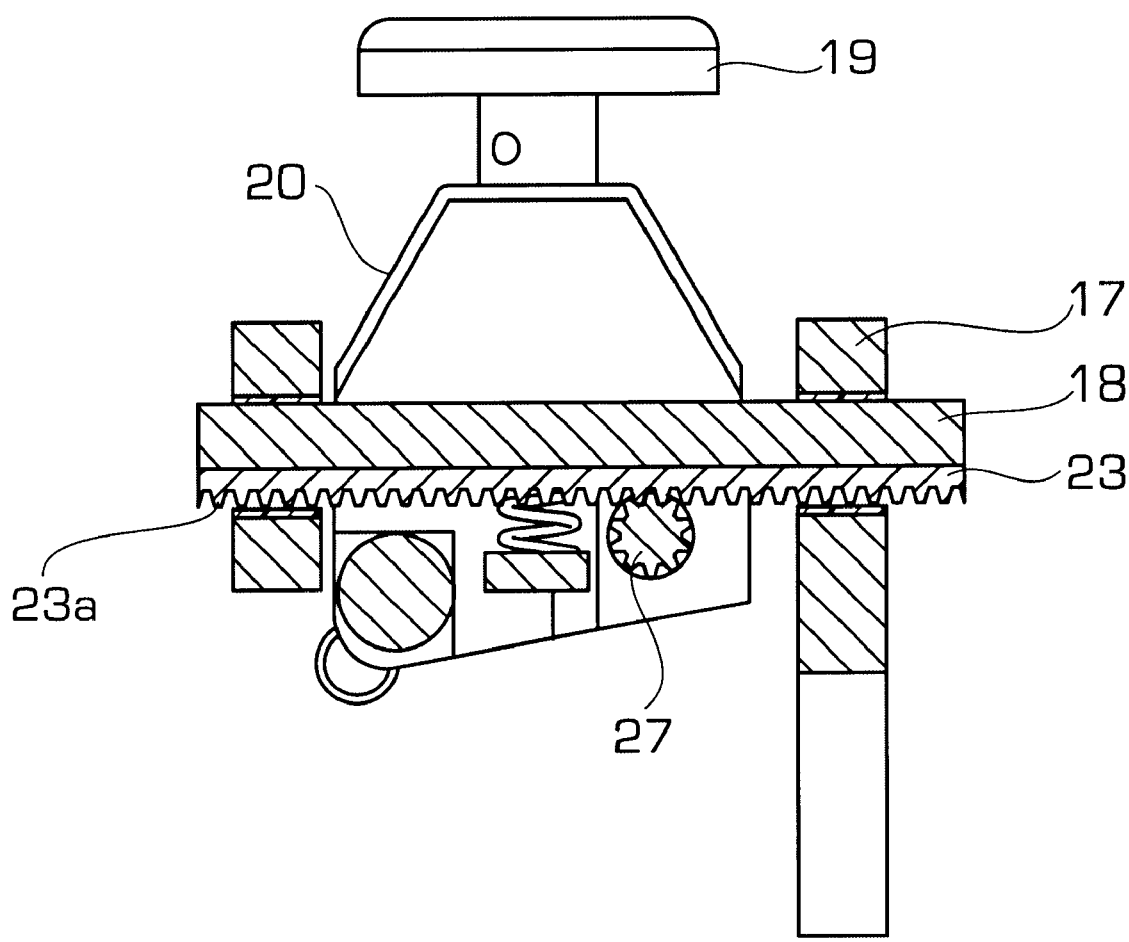
FIG. 3B shows a sectional view of the adjustable product guide assembly according to the present invention.

The adjustable product guide assembly 15 in the embodiment of the present invention, as shown in FIGS. 2, 3A, and 3B, includes a product guide plate 16 or movable guide disposed behind the rotating saw blade 8 and is parallel to the width of the saw blade 8.

A hand knob 19 is mounted on top of a bracket 20 which houses a worm and gear set 21 that turns when the hand knob 19 is turned to rotate a pinion gear 27. The pinion gear 27 is in contact with a rack 23 of gear teeth 23a (see FIG. 3B) mounted to the round bar 18. The whole bracket and gear assembly is mounted to a guide bracket 17 that slides back and forth on a round bar or rack 18 as the pinion gear 27 turns on the rack 23 of gear teeth 23a.

Figure 4:
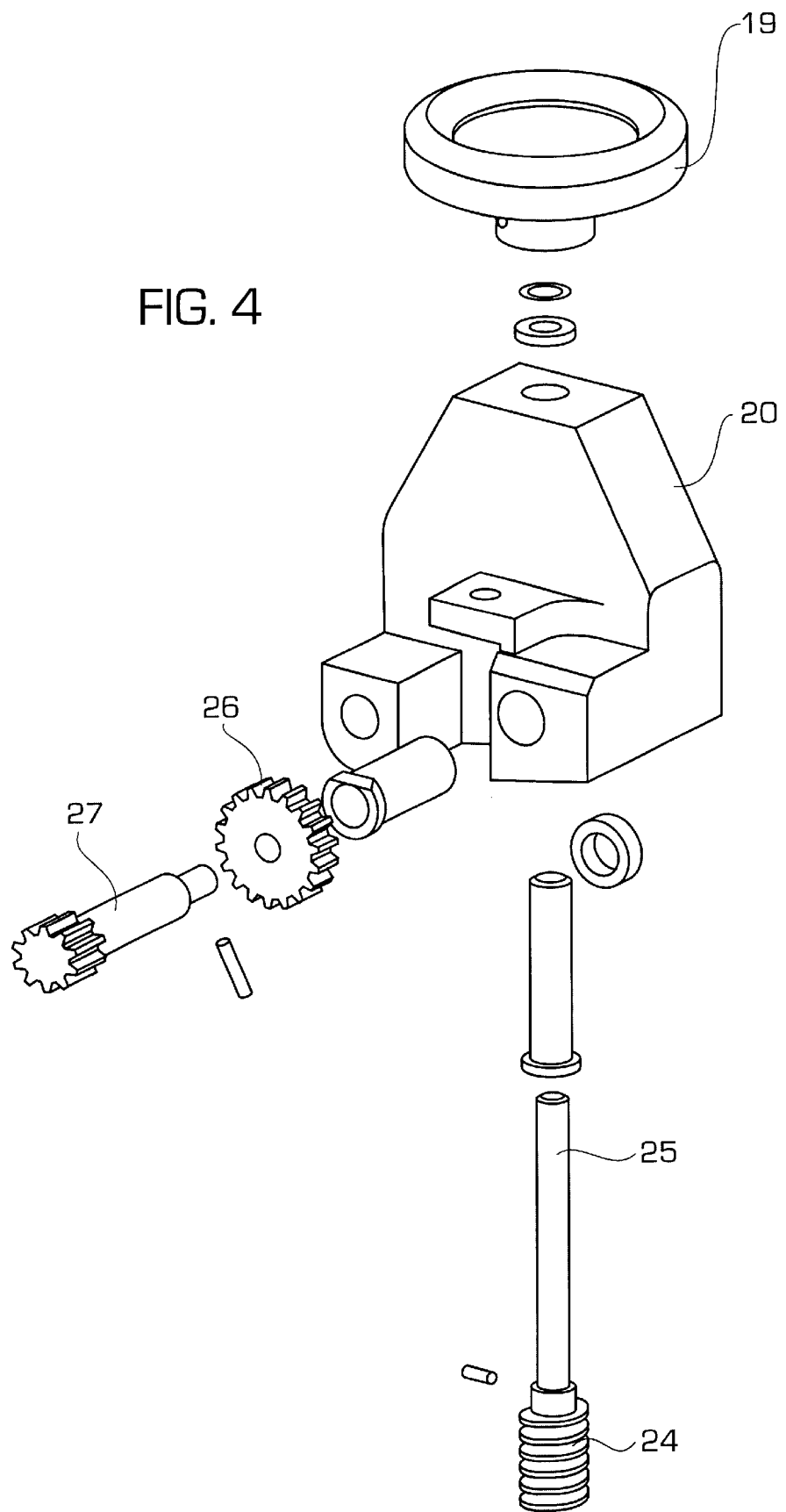
FIG. 4 shows a bracket and related components of the adjustable product guide assembly according to the present invention.

Specifically, when the hand knob 19 is turned (see FIG. 4), the knob 19 rotates a worm 24 which is pinned to a shaft 25 and connected to the hand knob 19. The worm 24 turns the worm gear 26 which is pinned to the pinion gear 27. The gears 26, 27 are sized so one revolution of the hand knob 19 turns the worm gear 26, by 36 degrees, which causes the pinion gear 27 to displace 0.2 inches of linear motion. This 10:1 ratio of the turning hand knob 19 and the turning pinion gear 27 provides the ability to make small adjustments to the position of the product guide plate 16.

Figure 5:
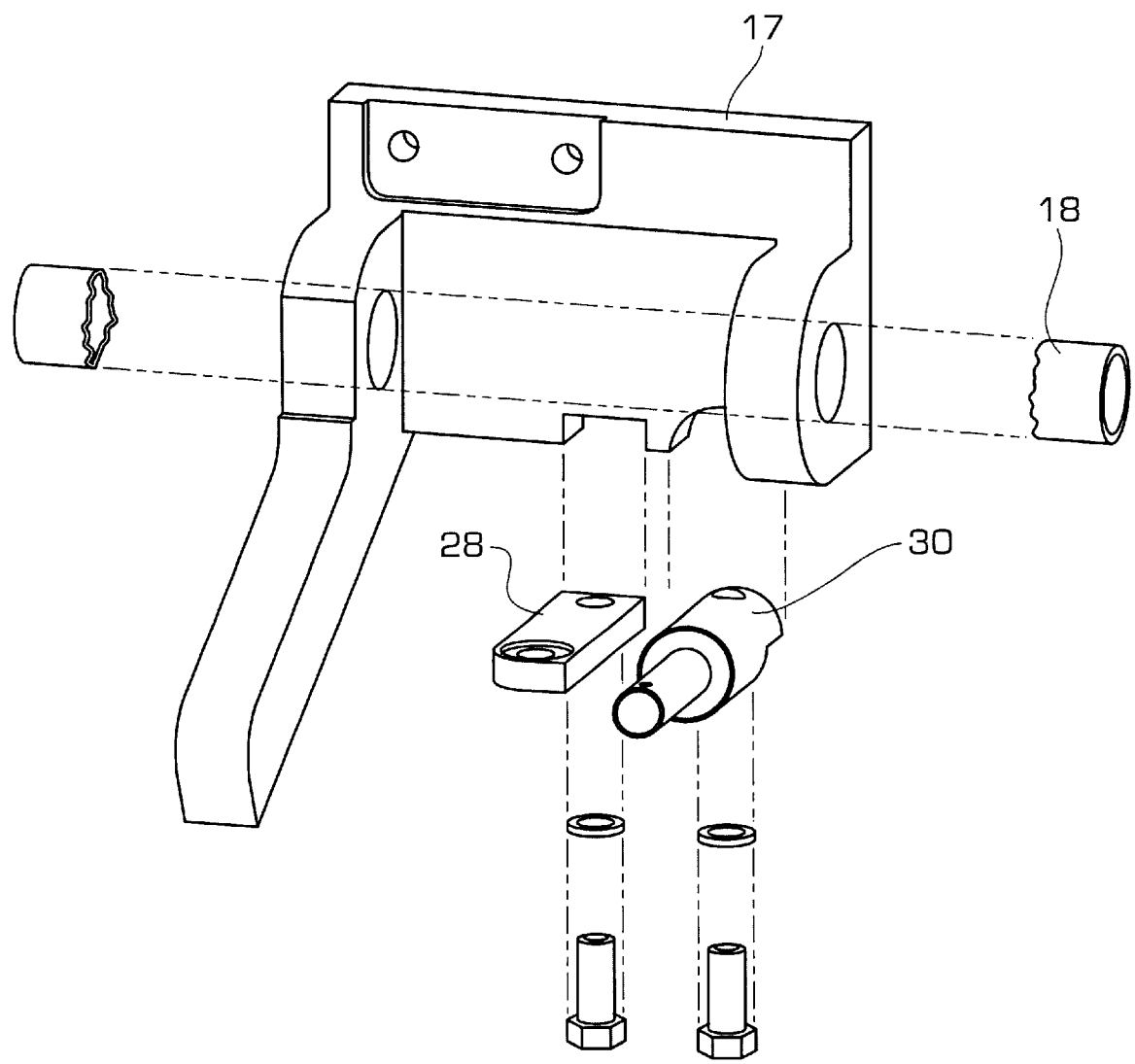
FIG. 5 shows the bracket control guide and related components of the adjustable product guide assembly according to the present invention.

The pinion gear 27 rests against the gear rack teeth 23a of the gear rack assembly by a compression spring 29 that is disposed (presses) between the bracket 20 that houses the gears 20 24, 26 and the bracket 28 (see FIG. 5) that is attached to the control guide bracket 17. The linear motion of the pinion gear 27 along the gear rack 23 moves the control guide bracket 17 and the product guide plate 16 which is attached to the control guide bracket 17, 0.2 inches per hand knob 19 revolution.

The pinion gear 27 can be disengaged from the gear rack teeth 23a using a gear releasing means by pressing down on the hand knob 19. In the gear releasing, the hand knob 19 is pressed, and this action causes the bracket 20 to pivot on the pivot rod 30, and the compression spring 29 (biasing means) to compress, and the product guide plate 16 can be slid forward and backward along the cylindrical part or round bar 18 of the gear rack assembly. When the hand knob 19 is released, the spring 29 is uncompressed and causes the pinion gear 27 to engage the gear rack teeth 23a to hold the product guide plate 16 in place.

Thus, the gear releasing means allows the product guide plate 16 to be slid into any position for larger position movements.

Since the hand knob 19 is placed on the top of bracket 20, it is convenient and ergonomic for the operator, and the adjustable product guide assembly is easily operated.

Thus, in operation, the product to be cut is placed on the movable front table 5 in front of the saw blade's 8 cutting edge. The product is then placed against the product guide plate 16 and moved through the rotating saw blade 8. The distance the product guide plate 16 is behind the saw blade 8 will be the thickness of the cut product. The product guide plate's 16 position must remain set during this process so the product thickness remains uniform, until the operator wants to change the thickness (or the distance from the blade 8) to fine tune the thickness of the cuts, to make a desired weight, or to change the thickness by incrementing the meat guide movement as the product being cut is changing in size, in order to maintain the desired weight.

In the normal position, the pinion gear 27 is engaged and the position of the adjustable product guide 16 is set. When the operator wishes to change the thickness, the operator grabs the hand knob 19 and presses down to release the pinion gear 27 and its engagement with the rack gear teeth 23a that are mounted to the round bar 18, to allow the adjustable product guide 16 to move backward and forward. Thus, the operator will turn the knob 19 by hand and the pinion gear 27 will rotate along the gear rack teeth 23a. In so moving the adjustable product guide 16, the operator can more precisely control the movement of the product guide plate 16 back and forth.

In summary, the advantages provided by the present invention include the 10:1 ratio of the turning hand knob and the turning pinion gear, so small adjustments can be made to the position of the meat guide; the easy gear releasing means so that the product guide plate can be slid into any position for larger position movements; and the placement of the hand knob being in an operator-convenient (ergonomic) location, so that the adjustable product guide assembly is easily operated.

Although the invention has been described in detail with reference to particular embodiments thereof, this description is not meant to be construed in a limiting sense. Various modifications of the disclosed embodiments, as well as alternative embodiments of the invention, will become apparent to persons skilled in the art upon reading the foregoing. It is therefore contemplated that such modifications can be made without departing from the scope of the present invention as defined in the appended claims.

What is claimed is:

1. An adjustable product guide assembly for a product saw device, comprising:
   a rack assembly;
   a first bracket slidably mounted on said rack assembly;
   a product guide plate mounted on said first bracket;
   a second bracket pivotally mounted on said first bracket, said second bracket supporting a gear assembly that is engagable with said rack assembly;
   a handle mounted on said second bracket, said handle for imparting rotational motion to said gear assembly;
   a biasing member disposed between said second bracket and said first bracket, said biasing member influencing said second bracket such that said gear assembly engages with said rack assembly;
   wherein said handle is pressable to pivot said second bracket relative to said first bracket, against the influence of said biasing member, such that said gear assembly disengages from said rack assembly.

2. An adjustable product guide assembly for a product saw device, comprising:
   a bar with a rack assembly disposed thereon;
   a first bracket slidably mounted on said bar;
   a product guide plate mounted on said first bracket;
   a second bracket pivotally mounted on said first bracket, said second bracket supporting a gear assembly that is engagable with said rack assembly;
   a handle mounted on said second bracket, said handle for imparting rotational motion to said gear assembly;
   a biasing means for (1) influencing said second bracket such that said gear assembly engages with said rack assembly, and (2) for compressing when said handle is pressed such that said gear assembly disengages from said rack assembly.

3. The adjustable product guide assembly according to claim 2, wherein said gear assembly comprises:
   a first worm gear coupled to said handle;
   a second worm gear that is turnable by said first worm gear; and
   a pinion gear connected to said second worm gear, said pinion gear being engagable with said rack assembly.

4. The adjustable product guide assembly according to claim 3, wherein said biasing means is a spring.

5. The adjustable product guide assembly according to claim 3, wherein said first worm gear and said second worm gear are sized such that one revolution of said handle turns said second worm gear 36 degrees which causes said pinion gear to displace 0.2 inches of linear motion along said rack assembly.

6. The adjustable product guide assembly according to claim 3, wherein a 10:1 ratio exists between said handle and said pinion gear.

7. An adjustable product guide assembly for a product saw device, comprising:
   a bar with a gear rack disposed thereon;
   a first bracket slidably mounted on said bar;
   a product guide plate mounted on said first bracket;
   a second bracket pivotally mounted on said first bracket, said second bracket supporting a first worm gear, a second worm gear, and a pinion gear, said second worm gear being turnable by said first worm gear and pinned to said pinion gear;
   a handle mounted on said second bracket and connected to said first worm gear for imparting rotational motion to said first worm gear;
   a biasing member disposed between said second bracket and said first bracket, said biasing member influencing said second bracket such that said pinion gear engages with said gear rack;
   wherein, when said handle is pressed, said second bracket pivots relative to said first bracket, against the influence of said biasing member, such that said pinion gear disengages from said gear rack.

8. The adjustable product guide assembly according to claim 7, wherein said first worm gear and said second worm gear are sized such that one revolution of said handle turns said second worm gear 36 degrees which causes said pinion gear to displace 0.2 inches of linear motion relative to said gear rack 9. The adjustable product guide assembly according to claim 7, wherein a 10:1 ratio exists between said handle and said pinion gear.

10. The adjustable product guide assembly according to claim 7, wherein said biasing member is a spring.

* * * * *